United States Patent
Verma et al.

(10) Patent No.: US 10,935,286 B2
(45) Date of Patent: Mar. 2, 2021

(54) HIGH EFFICIENCY REFRIGERATION SYSTEM

(71) Applicant: Carrier Corporation, Farmington, CT (US)

(72) Inventors: Parmesh Verma, Manchester, CT (US); Frederick J. Cogswell, Glastonbury, CT (US); Thomas D. Radcliff, Vernon, CT (US); Mohsen Farzad, Glastonbury, CT (US); Vladimir Blasko, Avon, CT (US); Jules R. Munoz, Manlius, NY (US); Seshadri Sivakumar, Halifax (CA)

(73) Assignee: CARRIER CORPORATION, Palm Beach Gardens, FL (US)

( * ) Notice: Subject to any disclaimer, the term of this patent is extended or adjusted under 35 U.S.C. 154(b) by 398 days.

(21) Appl. No.: 14/348,531

(22) PCT Filed: Sep. 27, 2012

(86) PCT No.: PCT/US2012/057549
§ 371 (c)(1),
(2) Date: Mar. 28, 2014

(87) PCT Pub. No.: WO2013/049344
PCT Pub. Date: Apr. 4, 2013

(65) Prior Publication Data
US 2014/0260404 A1    Sep. 18, 2014

Related U.S. Application Data

(60) Provisional application No. 61/541,544, filed on Sep. 30, 2011.

(51) Int. Cl.
*F25B 25/00* (2006.01)
*F25B 23/00* (2006.01)
(Continued)

(52) U.S. Cl.
CPC ............ *F25B 25/005* (2013.01); *F25B 9/008* (2013.01); *F25B 23/006* (2013.01); *F25B 25/02* (2013.01);
(Continued)

(58) Field of Classification Search
CPC ...... F25B 9/008; F25B 23/006; F25B 25/005; F25B 2309/06; F25B 41/00;
(Continued)

(56) References Cited

U.S. PATENT DOCUMENTS 2,255,969 A * 9/1941 Franco-Ferreira ........ F28F 1/32
165/150
3,195,316 A * 7/1965 Maher .................... F17C 13/025
62/48.2

(Continued)

FOREIGN PATENT DOCUMENTS

| CN | 1117568 A | 2/1996 |
| CN | 2765110 A | 3/2006 |

(Continued)

OTHER PUBLICATIONS

Chinese Office Action regarding Application No. 201280047744.8 dated Aug. 24, 2015, 4 pgs.
(Continued)

*Primary Examiner* — Joseph F Trpisovsky
(74) *Attorney, Agent, or Firm* — Cantor Colburn LLP

(57) ABSTRACT

A refrigerant system includes a first, substantially outdoor, two phase heat transfer fluid vapor compression circulation loop including a compressor, a heat exchanger condenser, an expansion device, and the heat absorption side of a heat exchanger evaporator condenser, connected by conduit in a closed loop and having disposed therein a first heat transfer fluid having a critical temperature of greater than or equal to 31.2° C. The system also includes a second, at least partially
(Continued)

indoor, two phase heat transfer fluid circulation loop that transfers heat to the first loop through the heat exchanger evaporator condenser. The second loop includes the heat rejection side of the heat exchanger evaporator condenser, a liquid pump, and a heat exchanger evaporator, connected by conduit in a closed loop and having disposed therein a second heat transfer fluid that has an ASHRAE Class A toxicity rating and an ASHRAE Class 1 or 2L flammability rating.

19 Claims, 2 Drawing Sheets

(51) Int. Cl.
    *F25B 9/00*     (2006.01)
    *F25B 41/00*     (2021.01)
    *F25B 25/02*     (2006.01)

(52) U.S. Cl.
    CPC .......... *F25B 41/00* (2013.01); *F25B 2309/06* (2013.01); *F25B 2341/0012* (2013.01); *F25B 2341/065* (2013.01); *F25B 2400/12* (2013.01); *F25B 2600/0253* (2013.01); *F25B 2600/13* (2013.01); *Y02B 30/70* (2013.01)

(58) Field of Classification Search
    CPC ........ F25B 2341/0012; F25B 2341/065; F25B 2400/12; F25B 2600/0253; F25B 7/00; F25B 23/005; F25B 1/06; F25B 2500/26; F25B 2500/27; B60H 2001/3298
    USPC .................................................. 62/333, 434
    See application file for complete search history.

(56) References Cited

U.S. PATENT DOCUMENTS

| | | | |
|---|---|---|---|
| 3,670,519 A | 6/1972 | Newton | |
| 3,701,264 A | 10/1972 | Newton | |
| 3,881,323 A * | 5/1975 | Porter | C09K 5/20 62/216 |
| 3,939,908 A * | 2/1976 | Chartet | F28D 1/05333 165/149 |
| 4,184,325 A * | 1/1980 | Mandrin | F01K 23/10 122/7 R |
| 5,069,276 A | 12/1991 | Seidel | |
| 5,291,945 A | 3/1994 | Blomgren et al. | |
| 5,784,893 A * | 7/1998 | Furuhama | C09K 5/041 62/333 |
| 6,619,066 B1 * | 9/2003 | Kaneo | F25B 25/005 62/114 |
| 7,398,819 B2 | 7/2008 | Taras et al. | |
| 7,472,744 B2 | 1/2009 | Gorbounov et al. | |
| 2005/0120737 A1 | 6/2005 | Borror et al. | |
| 2007/0056312 A1 * | 3/2007 | Kobayashi | F25B 7/00 62/335 |
| 2007/0158052 A1 * | 7/2007 | Lin | H01L 23/427 165/104.33 |
| 2007/0271936 A1 * | 11/2007 | Wakamoto | F25B 7/00 62/160 |
| 2009/0113905 A1 * | 5/2009 | Ericsson | F25B 41/006 62/126 |
| 2010/0319377 A1 * | 12/2010 | Moriwaki | C09K 5/045 62/238.6 |
| 2010/0326095 A1 * | 12/2010 | Van Horn | C09K 5/044 62/77 |
| 2011/0100038 A1 * | 5/2011 | Haussmann | B60H 1/3204 62/115 |
| 2011/0168362 A1 * | 7/2011 | Hall | F24F 3/001 165/121 |
| 2011/0289953 A1 * | 12/2011 | Alston | B60H 1/32 62/238.6 |

FOREIGN PATENT DOCUMENTS

| | | | |
|---|---|---|---|
| CN | 1886625 A | 12/2006 | |
| CN | 1928461 A | 3/2007 | |
| CN | 101186808 A | 5/2008 | |
| CN | 101688708 A | 10/2010 | |
| GB | 2005398 A | 4/1979 | |
| GB | 2258298 A | 2/1993 | |
| GB | 2515719 A * | 1/2015 | ............... F25B 7/00 |
| WO | WO2009009164 A1 | 1/2009 | |
| WO | 2011014784 A2 | 2/2011 | |
| WO | WO2011014784 A2 | 2/2011 | |

OTHER PUBLICATIONS

Chinese Search Report for Application No. 201280047744.8 dated Aug. 16, 2015; 3 pgs.
International Search Report for International Application No. PCT/US2012/057549 dated May 23, 2013, 5 pages.
Written Opinion for International Application No. PCT/US2012/057549 dated May 23, 2013, 8 pages.
Translation of CN Office Action regarding related CN App. No. 201280047744.8, dated May 3, 2016, 11 pgs.
Press Release, "ASHRAE Publishes 2010 Editions of Refrigerant Safety Standards," Oct. 14, 2010; retrieved from the internet Feb. 12, 2017, http://hvacautomation.com/news/ashrae-publishes-2010-editions-refrigerant-safety-standards.
Dekker, Marcel, "Synthetic Lubricants and High-Performance Functional Fluids"; abstract retrieved from the internet May 16, 2017; https://www.researchgate.net/publication/291536336_Synthetic_Lubricants_and_Hi-Performance_Functional_Fluids; 1993; 6 pgs.
Office Action regarding related EP App. No. 12 778 534.3; dated Mar. 16, 2017; 8 pgs.
ANSI/ASHRAE Standard 34-2010, "Designation and Safety Classification of Refrigerants," ISSN 1041-2336; copyright 2010; 44 pgs.
European Search Report for European Application No. 12778534.3; Application Filing Date Sep. 27, 2012; dated Apr. 9, 2020; 8 pages.

* cited by examiner

HIGH EFFICIENCY REFRIGERATION SYSTEM

CROSS REFERENCE TO RELATED APPLICATIONS

This application is a National Phase Application of Patent Application PCT/US2012/057549 filed on Sep. 27, 2012, which claims priority to U.S. 61/541,544 filed Sep. 30, 2011, the disclosure of which is incorporated herein by reference in its entirety.

BACKGROUND OF THE INVENTION

The subject matter disclosed herein generally relates to fluorinated hydrocarbon compositions and their use.

Refrigerant systems are known in the HVAC&R (heating, ventilation, air conditioning and refrigeration) art, and operate to compress and circulate a heat transfer fluid throughout a closed-loop heat transfer fluid circuit connecting a plurality of components, to transfer heat away from a secondary fluid to be delivered to a climate-controlled space. In a basic refrigerant system, heat transfer fluid is compressed in a compressor from a lower to a higher pressure and delivered to a downstream heat rejection heat exchanger, commonly referred to as a condenser for applications where the fluid is sub-critical and the heat rejection heat exchanger also serves to condense heat transfer fluid from a gas state to a liquid state. From the heat rejection heat exchanger, where heat is typically transferred from the heat transfer fluid to ambient environment, high-pressure heat transfer fluid flows to an expansion device where it is expanded to a lower pressure and temperature and then is routed to an evaporator, where heat transfer fluid cools a secondary fluid to be delivered to the conditioned environment. From the evaporator, heat transfer fluid is returned to the compressor. One common example of refrigerant systems is an air conditioning system, which operates to condition (cool and often dehumidify) air to be delivered into a climate-controlled zone or space. Other examples may include refrigeration systems for various applications requiring refrigerated environments.

Historically, conventional HFC and HCFC heat transfer fluids such as R22, R123, R407C, R134a, R410A and R404A, have been utilized in air conditioning and refrigeration applications. Recently, however, concerns about global warming and, in some cases, ozone depletion, have created a need for alternative heat transfer fluids. In some cases, the use of natural heat transfer fluids such as R744 ($CO_2$), R718 (water), or R717 (ammonia) has been proposed. The various known and proposed heat transfer fluids each have their own advantages and disadvantages. For example, $CO_2$ as a heat transfer fluid offers zero ozone depletion potential and low global warming potential compared to many hydrocarbon-based heat transfer fluids. However, many proposed systems having $CO_2$ as a heat transfer fluid require the CO2 to be maintained in a supercritical fluid state, which can add to equipment and operating complexity and cost. Thus, there continues to be a need for new refrigerant/systems that offer improved performance, environmental footprint, cost, or any combination thereof.

BRIEF DESCRIPTION OF THE INVENTION

According to one aspect of the invention, a refrigerant system includes a first, substantially outdoor, two-phase heat transfer fluid vapor/compression circulation loop comprising a compressor, a heat exchanger condenser, an expansion device, and the heat absorption side of a heat exchanger evaporator/condenser, connected by conduit in a closed fluid circulation loop and having disposed therein a first heat transfer fluid having a critical temperature of greater than or equal to 31.2° C. The system also includes a second, at least partially indoor, two-phase heat transfer fluid circulation loop that transfers heat to the first heat transfer fluid circulation loop through the heat exchanger evaporator/condenser, comprising the heat rejection side of the heat exchanger evaporator/condenser, a liquid pump, and a heat exchanger evaporator, connected by conduit in a closed fluid circulation loop and having disposed therein a second heat transfer fluid that has an ASHRAE Class A toxicity rating and an ASHRAE Class 1 or 2L flammability rating.

By substantially outdoor, it is understood that a majority if not all of the loop and components are outdoors, but that portions of the substantially outdoor first loop may be indoors. By at least partially indoor, it is understood that at least a portion of the loop and components thereof is indoors. The at least partially indoor loop can be used to transfer heat from an indoor location that is remote from exterior walls of a building and has more stringent requirements for flammability and toxicity of the heat transfer fluid. The substantially outdoor loop can be used to transfer heat from the indoor loop to the outside environment, and can utilize a heat transfer fluid chosen to provide the outdoor loop with thermodynamic that work efficiently while meeting targets for global warming potential (GWP) and ozone depleting potential (ODP).

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
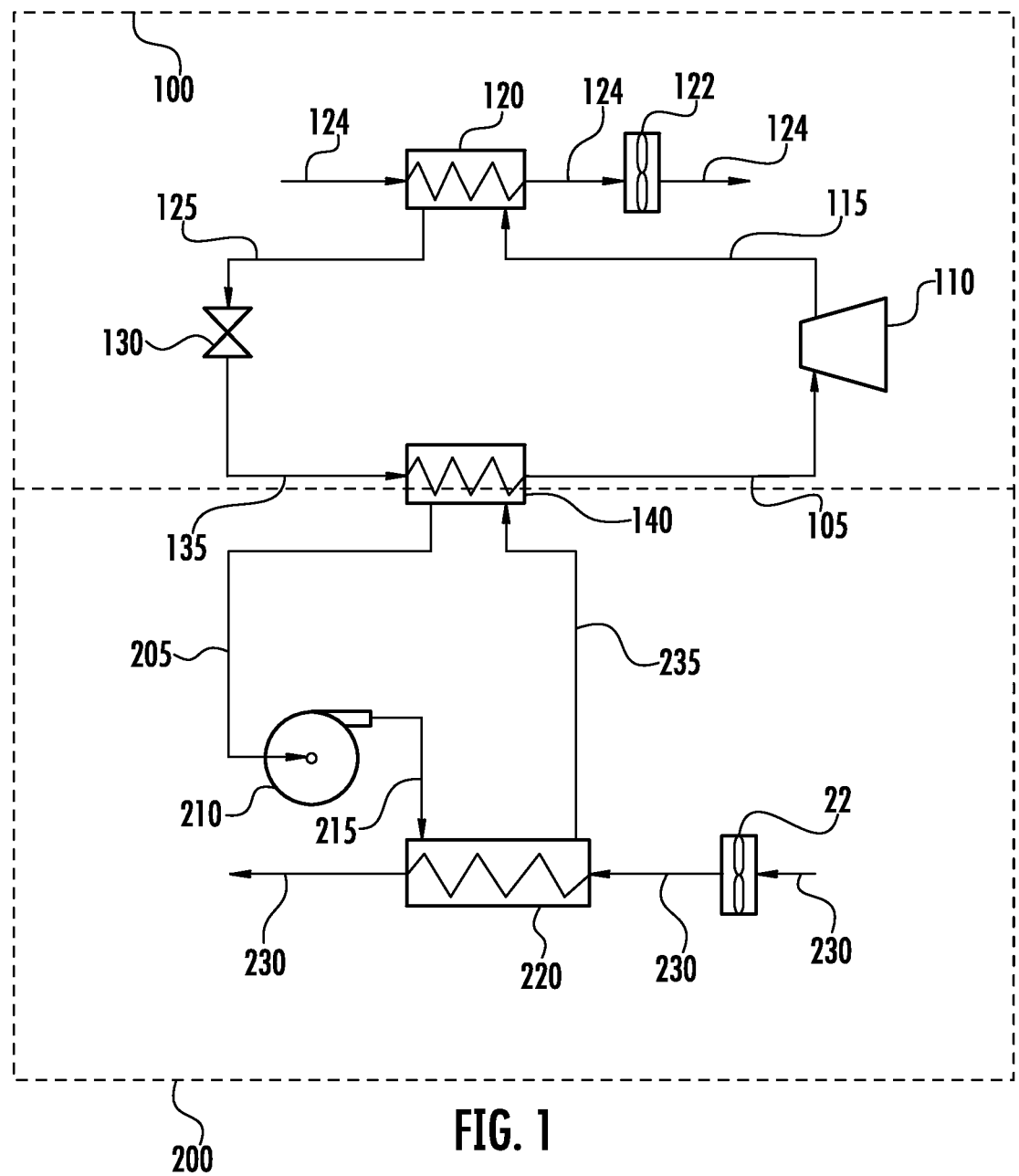
FIG. 1 is a block schematic diagram depicting a heat transfer system having primary and secondary heat transfer fluid circulation loops.

An exemplary heat transfer system with first and second heat transfer fluid circulation loop is shown in block diagram form in FIG. 1. As shown in FIG. 1, a compressor 110 in first fluid circulation loop 100 pressurizes a first heat transfer fluid in its gaseous state, which both heats the fluid and provides pressure to circulate it throughout the system. The hot pressurized gaseous heat transfer fluid exiting from the compressor 110 flows through conduit 115 to heat exchanger condenser 120, which functions as a heat exchanger to transfer heat from the heat transfer fluid to the surrounding environment, such as to air blown by fan 122 through conduit 124 across the heat exchanger condenser 120. The hot heat transfer fluid condenses in the condenser 120 to a pressurized moderate temperature liquid. The liquid heat transfer fluid exiting from the condenser 120 flows through conduit 125 to expansion device 130, where the pressure is reduced. The reduced pressure liquid heat transfer fluid exiting the expansion device 130 flows through conduit 135 to the heat absorption side of heat exchanger evaporator/condenser 140, which functions as a heat exchanger to absorb heat from a second heat transfer fluid in secondary fluid circulation loop 200, and vaporize the first heat transfer fluid to produce heat transfer fluid in its gas state to feed the compressor 110 through conduit 105, thus completing the first fluid circulation loop.

A second heat transfer fluid in second fluid circulation loop 200 transfers heat from the heat rejection side of heat exchanger evaporator/condenser 140 to the first heat transfer fluid on the heat absorption side of the heat exchanger 140, and the second heat transfer fluid vapor is condensed in the process to form second heat transfer fluid in its liquid state. The liquid second heat transfer fluid exits the heat exchanger evaporator/condenser 140 and flows through conduit 205 as a feed stream for liquid pump 210. The liquid second heat transfer fluid exits pump 210 at a higher pressure than the pump inlet pressure and flows through conduit 215 to heat exchanger evaporator 220, where heat is transferred to air blown by fan 225 through conduit 230. Liquid second heat transfer fluid vaporizes in heat exchanger evaporator 220, and gaseous second heat transfer fluid exits the heat exchanger evaporator 220 and flows through conduit 235 to the heat rejection side of heat exchanger evaporator/condenser 140, where it condenses and transfers heat to the first heat transfer fluid in the primary fluid circulation loop 100, thus completing the second fluid circulation loop 200.

In an additional exemplary embodiment, the second fluid circulation loop 200 may include multiple heat exchanger evaporators (and accompanying fans) disposed in parallel in the fluid circulation loop. This may be accomplished by including a header (not shown) in conduit 215 to distribute the second heat transfer fluid output from pump 210 in parallel to a plurality of conduits, each leading to a different heat exchanger evaporator (not shown). The output of each heat exchanger evaporator would feed into another header (not shown), which would feed into conduit 235. Such a system with multiple parallel heat exchanger evaporators can provide heat transfer from a number of locations throughout an indoor environment without requiring a separate outdoor fluid distribution loop for each indoor unit, which cannot be readily achieved using indoor loops based on conventional 2-phase variable refrigerant flow systems that require an expansion device for each evaporator. A similar configuration can optionally be employed in the first fluid circulation loop 100 to include multiple heat exchanger condensers (and accompanying fans and expansion devices) disposed in parallel in the fluid circulation loop, with a header (not shown) in conduit 115 distributing the first heat transfer fluid in parallel to a plurality of conduits each leading to a different heat exchanger condenser and expansion device (not shown), and a header (not shown) in conduit 135 to recombine the parallel fluid flow paths. When multiple heat exchanger condensers are used, the number of heat exchanger condensers and expansion devices would generally be fewer than the number of heat exchanger evaporators.

The first heat transfer fluid circulation loop utilizes heat transfer fluids that are not restricted in terms of flammability and/or toxicity, and this loop is a substantially outdoor loop. The second heat transfer fluid circulation loop utilizes heat transfer fluids that meet certain flammability and toxicity requirements, and this loop is substantially an indoor loop. By substantially outdoor, it is understood that a majority if not all of the loop is outdoors, but that portions of the substantially outdoor first loop may be indoors and that portions of the substantially indoor second loop may be outdoors. In an exemplary embodiment, any indoor portion of the outdoor loop is isolated in a sealed fashion from other protected portions of the indoors so that any leak of the first heat transfer fluid will not escape to protected portions of the indoor structure. In another exemplary embodiment, all of the substantially outdoor loop and components thereof is located outdoors. By at least partially indoor, it is understood that at least a portion of the loop and components thereof is indoors, although some components such as the liquid pump 210 and/or the heat exchanger evaporator condenser 140 may be located outdoors. The at least partially indoor loop can be used to transfer heat from an indoor location that is remote from exterior walls of a building and has more stringent requirements for flammability and toxicity of the heat transfer fluid. The substantially outdoor loop can be used to transfer heat from the indoor loop to the outside environment, and can utilize a heat transfer fluid chosen to provide the outdoor loop with thermodynamic that work efficiently while meeting targets for global warming potential and ozone depleting potential. The placement of portions of the substantially outdoor loop indoors, or portions of the indoor loop outdoors will depend in part on the placement and configuration of the heat exchanger evaporator/condenser, where the two loops come into thermal contact. In an exemplary embodiment where the heat exchanger evaporator/condenser is outdoors, then portions of conduits 205 and/or 235 of the second loop will extend through an exterior building wall to connect with the outdoor heat exchanger evaporator/condenser 140. In an exemplary embodiment where the heat exchanger evaporator/condenser 140 is indoors, then portions of conduits 105 and/or 135 of the first substantially outdoor loop will extend through an exterior building wall to connect with the indoor heat exchanger evaporator/condenser 140. In such an embodiment where portions of the first loop extend indoors, then an enclosure vented to the outside may be provided for the heat exchanger evaporator/condenser 140 and the indoor-extending portions of conduits 105 and/or 135. In another exemplary embodiment, the heat exchanger evaporator/condenser 140 may be integrated with an exterior wall so that neither of the fluid circulation loops will cross outside of their primary (indoor or outdoor) areas.

The heat transfer fluid used in the first fluid circulation loop has a critical temperature of greater than or equal to 31.2° C., more specifically greater than or equal to 35° C., which helps enable it to maintain two phases under normal operating conditions. Exemplary heat transfer fluids for use in the first fluid circulation loop include but are not limited to saturated hydrocarbons (e.g., propane, isobutane), unsaturated hydrocarbons (e.g., propene), R32, R152a, ammonia, an R1234 isomer (e.g., R1234yf, R1234ze, R1234zf), R410a, and mixtures comprising one or more of the foregoing.

The heat transfer fluid used in the second fluid circulation loop has an ASHRAE Class A toxicity rating and an ASHRAE Class 1 or 2L flammability rating. Exemplary heat transfer fluids for use in the second fluid circulation loop include but are not limited to sub-critical fluid $CO_2$, a mixture comprising an R1234 isomer (e.g., R1234yf, R1234ze) and an R134 isomer (e.g., R134a, R134) or R32, 2-phase water, or mixtures comprising one or more of the foregoing. In another exemplary embodiment, the second heat transfer fluid comprises at least 25 wt %, and more specifically at least 50 wt % sub-critical fluid $CO_2$. In yet another exemplary embodiment, the second heat transfer fluid comprises nanoparticles to provide enhanced thermal conductivity. Exemplary nanoparticles include, but are not limited to, particles having a particle size less than 500 nm (more specifically less than 200 nm). In an exemplary embodiment, the nanoparticles have a specific heat greater than that of the second fluid. In yet another exemplary embodiment, the nanoparticles have a thermal conductivity greater than that of the second fluid. In further exemplary embodiments, the nanoparticles have a specific heat greater than at least 5 J/mol·K (more specifically at least 20 J/mol·K), and/or a thermal conductivity of at least 0.5 W/m·K (more specifically at least 1 W/m·K). In another exemplary embodiment, the second heat transfer fluid comprises greater than 0 wt % and less than or equal to 10 wt % nanoparticles, more specifically from 0.01 to 5 wt % nanoparticles. Exemplary nanoparticles include but are not limited to carbon nanotubes and metal or metalloid oxides such as $Si_2O_3$, $CuO$, or $Al_2O_3$.

Figure 2:
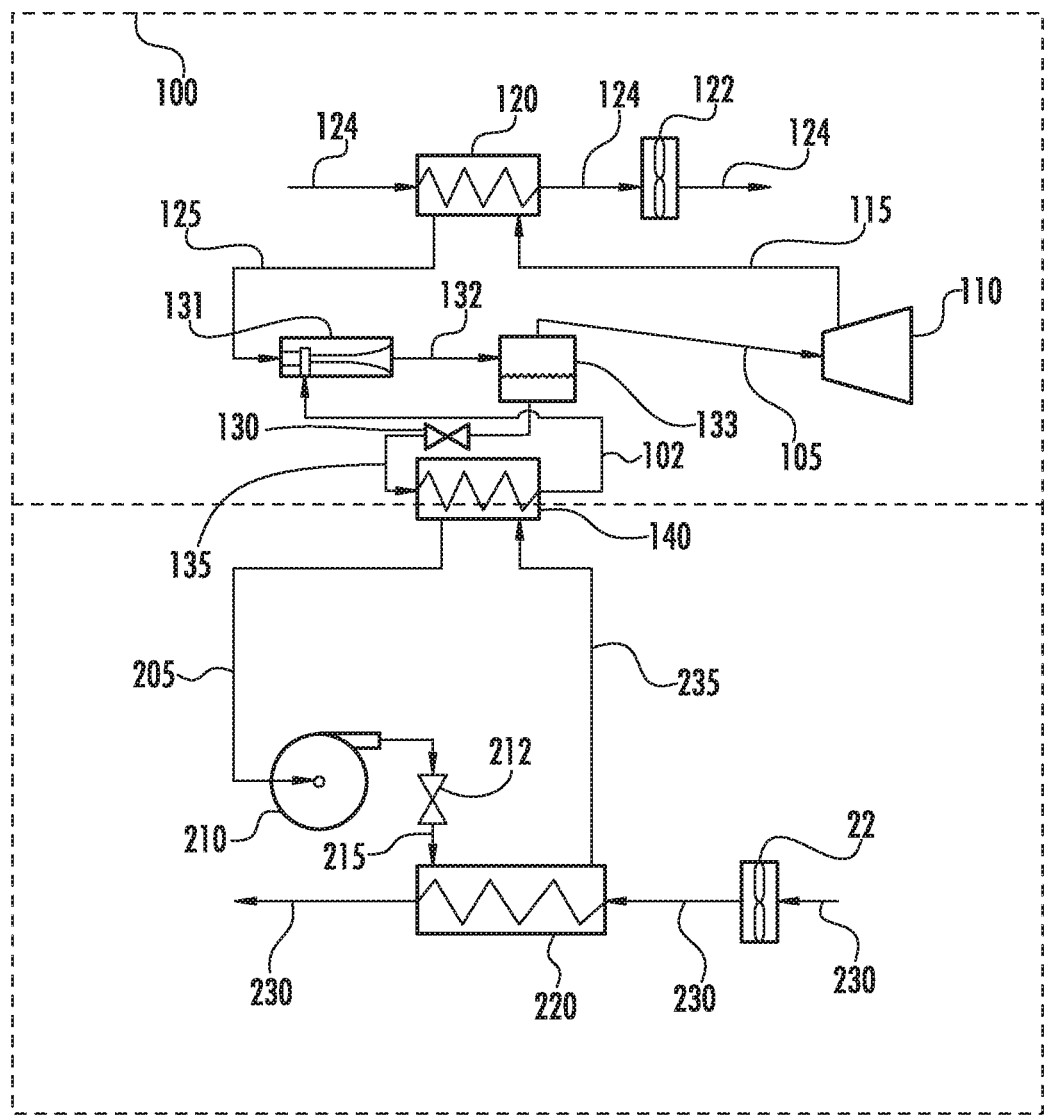
FIG. 2 is a schematic diagram of a 2-phase ejector for expanding the heat transfer fluid in the primary heat transfer fluid circulation loop systems like the one depicted in FIG. 1.

The expansion device used in the first heat transfer fluid circulation loop may be any sort of known thermal expansion device, including a simple orifice or a thermal expansion valve (TXV) or an electronically controllable expansion valve (EXV). Expansion valves can be controlled to control superheating at the outlet of the heat absorption side of the heat exchanger evaporator/condenser and optimize system performance. Such devices and their operation are well-known in the art and do not require additional detailed explanation herein. In another exemplary embodiment, the thermal expansion device comprises a two-phase ejector plus liquid/vapor separator assembly, which can provide added efficiency through work recovery to recover throttling losses otherwise lost in a TXV or EXV. Such two-phase ejector assemblies are also known in the art, as disclosed in U.S. Pat. No. 3,670,519, the disclosure of which is incorporated herein by reference in its entirety. In an exemplary embodiment, the two-phase ejector includes an electronically controlled expansion valve, as disclosed in U.S. Pat. No. 3,701,264, the disclosure of which is incorporated herein by reference in its entirety. Integration of a two-phase ejector into the first heat transfer fluid circulation loop is shown in FIG. 2. The fluid circulation loops in FIG. 2 are generally the same as in FIG. 1, except that liquid first heat transfer fluid exiting from the heat exchanger condenser 120 flows through conduit 125 to ejector 131. Vapor first heat transfer fluid exits from the heat exchanger evaporator/condenser 140 through conduit 102 to provide vaporized first heat transfer fluid to the ejector 131. Ejector 131 ejects a two-phase mixture of first heat transfer fluid through conduit 132, which feeds into liquid/vapor separator 133. Liquid first heat transfer fluid flows from separator 133 through conduit 135, which also includes an expansion valve 130, to the heat absorption side of heat exchanger evaporator/condenser 140. Vapor from separator 133 flows through conduit 105 to the inlet of compressor 110.

In another exemplary embodiment, one or more of the compressor 110, fan 122, fan 225, and/or pump 210 utilizes a variable speed drive (VSD). Control of VSD's can be implemented utilizing known power control technologies, such as an integrated power electronic system incorporating an input power factor correction (PFC) rectifier and one or more inverters (e.g., an inverter for each separate VSD). The input PFC rectifier converts single-phase AC input voltage into a regulated DC common bus voltage in order to provide a near unity power factor with low harmonic current from the AC supply. The motor inverters can be connected in parallel with input drawn from the common DC bus. Motors with higher power requirements (e.g., >1 kW such as for compressors) can use insulated gate bipolar transistors (IGBT's) as power switches whereas motors with lower power requirements (e.g., <1 kW such as for fan blowers) can use lower-cost metal oxide semiconductor field effect transistors (MOSFET's). Any type of electric motor can be used in the VSD's, including induction motors or permanent magnet (PM) motors. In an exemplary embodiment, the compressor 110 utilizes a PM motor, optionally in conjunction with electronic circuitry and/or a microprocessor that adaptively estimates the rotor magnet position using only the winding current signals, thus eliminating the need for expensive Hall effect sensors typically used in PM motors. The precise speed settings of the VSD's will vary depending on the demands placed on the system, but can be set by system control algorithms to maximize system operating efficiency and/or meet system demand as is known in the art. Typically, compressor and pump speed can be varied to control system capacity based on user demand, while the speed of the indoor and outdoor fan blowers can be controlled to optimize system efficiency.

An optional expansion device 212 such as an TXV or EXV can be incorporated into the second heat transfer fluid circulation loop in conduit 215 as shown in FIG. 2, although it is not required in certain exemplary embodiments where pump 210 has a VSD because the pump speed can be used to regulate the superheat of the heat absorption heat exchanger.

The heat exchangers used as the heat exchanger condenser 120, the heat exchanger evaporator/condenser 140, and the heat exchanger evaporator 220 may be any sort of conventional heat exchanger such as a shell and tube heat exchanger. Such heat exchangers are well-known in the art and do not require detailed explanation herein. In an exemplary embodiment, one or more of the heat exchanger condenser 120 and/or the heat exchanger evaporator 220 is a compact heat exchanger such as a microchannel heat exchanger. Microchannel heat exchangers can provide high heat transfer levels with reduced required quantities of heat transfer fluid. Exemplary useful microchannel heat exchangers can have individual tube diameters of less than 2 mm, more specifically less than 1.5 mm. Exemplary useful designs of microchannel heat exchangers are disclosed in U.S. Pat. No. 7,398,819 or 7,472,744, the disclosures of which are incorporated herein by reference in their entirety. In another exemplary embodiment, the heat exchanger evaporator/condenser 140 is a brazed plate heat exchanger. Such heat exchangers are well-known in the art, and represent a variant on the traditional shell and tube heat exchanger where the plates are disposed inside the shell. Plates are assembled together with brazing (or alternatively welding) along the periphery thereof, creating fluid flow channels between adjacent plates, with heat transfer occurring across the plate(s). Raised corrugations on interior surfaces of adjacent plates may also be brazed together to provide a circuitous pathway for fluid flow within the fluid channel. The plates have holes therein to provide fluid inlets and outlets, configured to direct fluid flow into the appropriate flow channels. Exemplary brazed plate heat exchangers are disclosed in U.S. Pat. Nos. 5,291,945, 5,069,276, and GB 2,005,398, the disclosures of which are incorporated herein by reference in their entirety.

In some exemplary embodiments, it may be desirable to monitor for refrigerant leaks (e.g., where the first refrigerant is highly flammable compound such as propane). A leak monitoring algorithm as is known in the art may be included to detect loss of refrigerant charge by actively monitoring refrigerant subcooling and suction superheat at a given compressor speed. Additionally, a refrigerant leak detector can be disposed in the environment proximate to the heat transfer fluid loop(s). In the event a leak is detected, the compressor and/or pump can be shut down and the blower fan(s) continue to operate run to ensure dilution of leaked heat transfer fluid with ambient air.

The heat transfer fluids utilized herein may include other components for the purpose of enhancing or providing certain functionality to the composition, or in some cases to reduce the cost of the composition. For example, refrigerant or other heat transfer fluid compositions may include a lubricant to provide lubrication to components such as the compressor, as is well-known in the art. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21. In an exemplary embodiment, the lubricants may comprise those commonly known as "mineral oils" in the field of compression refrigeration lubrication. Mineral oils may include paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In other exemplary embodiments, lubricants may include those commonly known as "synthetic oils" in the field of compression refrigeration lubrication. Synthetic oils may include alkylaryls (i.e. linear and branched alkyl alkylbenzenes), synthetic paraffins and napthenes, and poly(alphaolefins). Representative conventional lubricants include, but are not limited to, the commercially available BVM 100 N paraffinic mineral oil sold by BVA SUNISO 3GS and SUNISO 5GS naphthenic mineral oils sold by Crompton Co., SONTEX 372LT naphthenic mineral oil sold by Pennzoil, CALUMET RO-30 naphthenic mineral oil sold by Calumet Lubricants, ZEROL 75, ZEROL 150, and ZEROL 500 linear alkylbenzenes sold by Shrieve Chemicals and HAB 22 branched alkylbenzene sold by Nippon Oil.

Lubricants may further include those that have been designed for use with hydrofluorocarbon refrigerants and are miscible with refrigerants under compression refrigeration, air-conditioning, or heat pump apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as CASTROL 100 polyol ester sold by Castrol, United Kingdom, polyalkylene glycols (PAGs) such as RL-488A polyalkylene glycol from The Dow Chemical Company, and polyvinyl ethers (PVEs). These lubricants are readily available from various commercial sources. Lubricants may be selected by considering a given compressor's requirements and the environment to which the lubricant will be exposed. Lubricants may have a kinematic viscosity of at least about 5 cs at 40° C.

Commonly used refrigeration system additives may optionally be added, as desired, to compositions of the present invention in order to enhance lubricity and system stability. These additives are generally known within the field of refrigeration compressor lubrication, and include lubricant compatibilizers, anti wear agents, extreme pressure lubricants, corrosion and oxidation inhibitors, metal surface deactivators, free radical scavengers, foaming and antifoam control agents, leak detectants (e.g., UV-sensitive dyes), and the like. In general, these additives are present only in small amounts relative to the overall composition. They are typically used at concentrations of from less than about 0.1% to as much as about 3% of each additive. These additives are selected on the basis of the individual system requirements.

Some typical examples of such additives may include, but are not limited to, lubrication enhancing additives, such as alkyl or aryl esters of phosphoric acid and of thiophosphates. Additionally, the metal dialkyl dithiophosphates (e.g. zinc dialkyl dithiophosphate or ZDDP, Lubrizol 1375) and other members of this family of chemicals may be used in compositions of the present invention. Other antiwear additives include natural product oils and assymetrical polyhydroxyl lubrication additives such as Synergol TMS (International Lubricants). Similarly, stabilizers such as anti oxidants, free radical scavengers, and water scavengers may be employed. Compounds in this category can include, but are not limited to, butylated hydroxy toluene (BHT) and epoxides.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A heat transfer system, comprising:
a first two-phase vapor/compression fluid circulation loop, disposed outdoor, comprising a compressor, a heat exchanger condenser, an expansion device, and a heat absorption side of a heat exchanger evaporator/condenser, connected by conduit in a closed fluid circulation loop and having disposed therein a first heat transfer fluid having a critical temperature of greater than or equal to 31.2° C. selected from the group consisting of saturated hydrocarbons, unsaturated hydrocarbons, R32, R152a, an R1234 isomer, R410A, and mixtures of the foregoing; and
a second two-phase fluid circulation loop, disposed indoor, that transfers heat to the first two-phase vapor/compression fluid circulation loop through the heat exchanger evaporator/condenser, said second two-phase fluid circulation loop comprising a heat rejection side of the heat exchanger evaporator/condenser, a liquid pump, and a heat exchanger evaporator, connected by conduit in a closed fluid circulation loop and having disposed therein a second heat transfer fluid selected from the group consisting of sub-critical fluid $CO_2$, an R1234 isomer, a mixture of an R1234 isomer and an R134 isomer, 2-phase water, sub-critical fluid $CO_2$ in combination with nanoparticles, an R1234 isomer in combination with nanoparticles, a mixture of an R1234 isomer and an R134 isomer in combination with nanoparticles, 2-phase water in combination with nanoparticles and mixtures of the foregoing, wherein the second fluid circulation loop includes liquid second heat transfer fluid flowing in the conduit between the heat rejection side of the heat exchanger evaporator/condenser and the liquid pump and flowing in the conduit between the liquid pump and the heat exchanger evaporator, and gaseous second heat transfer fluid flowing in the conduit between the heat exchanger evaporator and the heat absorption side of the heat exchanger evaporator/condenser, and further wherein the liquid pump is a variable speed pump or the second fluid circulation loop includes an expansion device between the liquid pump and the heat exchanger evaporator.

2. The heat transfer system of claim 1, wherein the compressor in the first two-phase vapor/compression fluid circulation loop is a variable speed compressor.

3. The heat transfer system of claim 1, wherein the liquid pump in the second two-phase fluid circulation loop is said variable speed pump.

4. The heat transfer system of claim 1, wherein the second two-phase fluid circulation loop further comprises said expansion device between the liquid pump and the heat exchanger evaporator.

5. The heat transfer system of claim 1, wherein the first heat transfer fluid is a saturated hydrocarbon or unsaturated hydrocarbon.

6. The heat transfer system of claim 1, wherein the first heat transfer fluid is R32, R152a, an R1234 isomer, or R410a.

7. The heat transfer system of claim 1, wherein the second heat transfer fluid is selected from the group consisting of sub-critical fluid $CO_2$, a mixture of an R1234 isomer and an R134 isomer or R32, and 2-phase water.

8. The heat transfer system of claim 1, wherein the second heat transfer fluid has nanoparticles having a specific heat and a thermal conductivity that is greater than either or both of the specific heat and thermal conductivity of the second heat transfer fluid.

9. The heat transfer system of claim 1, wherein the expansion device in the first two-phase vapor compression fluid circulation loop is a two-phase ejector.

10. The heat transfer system of claim 9 wherein the ejector includes an electronically controlled expansion valve.

11. The heat transfer system of claim 1, wherein one or more of the heat exchanger condenser in the first two-phase vapor compression fluid circulation loop, the heat exchanger evaporator in the second two-phase fluid circulation loop, and the heat exchanger evaporator/condenser bridging the first two-phase vapor compression fluid circulation loop and the second two-phase fluid circulation loop is a microchannel heat exchanger.

12. The heat transfer system of claim 1, wherein one or more of the heat exchanger condenser in the first two-phase vapor compression fluid circulation loop, the heat exchanger evaporator in the second two-phase fluid circulation loop, and the heat exchanger evaporator/condenser bridging the first two-phase vapor compression fluid circulation loop and the second two-phase fluid circulation loop, comprises heat transfer plates or fins bonded by brazing or welding to the exterior of one or more tubes.

13. The heat transfer system of claim 1, comprising a plurality of heat exchanger evaporators disposed in parallel in the second two-phase fluid circulation loop, and optionally a plurality of heat exchanger condensers disposed in parallel in the first two-phase vapor compression fluid circulation loop provided that the number of heat exchanger condensers disposed in the first two-phase vapor compression fluid circulation loop is fewer than the number of heat exchanger evaporators disposed in the second two-phase fluid circulation loop.

14. A heat transfer system, comprising:
a first two-phase vapor/compression fluid circulation loop, disposed outdoors, comprising a compressor, a heat exchanger condenser, an expansion device, and a heat absorption side of a heat exchanger evaporator/condenser, connected by conduit in a closed fluid circulation loop and having disposed therein a first heat transfer fluid having a critical temperature of greater than or equal to 31.2° C. selected from the group consisting of saturated hydrocarbons, unsaturated hydrocarbons, R32, R152a, an R1234 isomer, R410A, and mixtures of the foregoing; and
a second two-phase fluid circulation loop, disposed indoors, that transfers heat to the first two-phase vapor/compression fluid circulation loop through the heat exchanger evaporator/condenser, said second two-phase fluid circulation loop comprising a heat rejection side of the heat exchanger evaporator/condenser, a liquid pump, and a heat exchanger evaporator, connected by conduit in a closed fluid circulation loop and having disposed therein a second heat transfer fluid selected from the group consisting of sub-critical fluid $CO_2$, an R1234 isomer, a mixture of an R1234 isomer and an R134 isomer, 2-phase water, sub-critical fluid $CO_2$ in combination with nanoparticles, an R1234 isomer in combination with nanoparticles, a mixture of an R1234 isomer and an R134 isomer in combination with nanoparticles, 2-phase water in combination with nanoparticles, and mixtures of the foregoing, wherein the second fluid circulation loop includes liquid second heat transfer fluid flowing in the conduit between the heat rejection side of the heat exchanger evaporator/condenser and the liquid pump and flowing in the conduit between the liquid pump and the heat exchanger evaporator, and gaseous second heat transfer fluid flowing in the conduit between the heat exchanger evaporator and the heat absorption side of the heat exchanger evaporator/condenser, and further wherein the liquid pump is a variable speed pump or the second fluid circulation loop includes an expansion device between the liquid pump and the heat exchanger evaporator.

15. The heat transfer system of claim 14, wherein the second heat transfer fluid is sub-critical fluid $CO_2$ or 2-phase water.

16. The heat transfer system of claim 15, wherein the first heat transfer fluid is a saturated hydrocarbon or unsaturated hydrocarbon, and the second heat transfer fluid is sub-critical fluid $CO_2$ or 2-phase water.

17. The heat transfer system of claim 16, wherein the first heat transfer fluid is R32, R152a, an R1234 isomer, or R410a, and the second heat transfer fluid is sub-critical fluid $CO_2$, or a mixture of an R1234 isomer and an R134 isomer or R32, or 2-phase water.

18. The heat transfer system of claim 14, wherein the first heat transfer fluid is propane and the second heat transfer fluid is sub-critical fluid $CO_2$.

19. A heat transfer system, comprising:
a first two-phase vapor/compression fluid circulation loop, disposed outdoors, comprising a compressor, a heat exchanger condenser, an expansion device, and a heat absorption side of a heat exchanger evaporator/condenser, connected by conduit in a closed fluid circulation loop and having disposed therein a first heat transfer fluid having a critical temperature of greater than or equal to 31.2° C. selected from the group consisting of saturated hydrocarbons, unsaturated hydrocarbons, R32, R152a, an R1234 isomer, R410A, and mixtures of the foregoing; and
a second two-phase fluid circulation loop, disposed indoors, that transfers heat to the first two-phase vapor/compression fluid circulation loop through the heat exchanger evaporator/condenser, said second two-phase fluid circulation loop comprising a heat rejection side of the heat exchanger evaporator/condenser, a liquid pump, and a heat exchanger evaporator, connected by conduit in a closed fluid circulation loop and having disposed therein a second heat transfer fluid selected from the group consisting of sub-critical fluid $CO_2$, an R1234 isomer, a mixture of an R1234 isomer and an R134 isomer, 2-phase water, and mixtures of the foregoing, wherein the second fluid circulation loop includes liquid second heat transfer fluid flowing in the conduit between the heat rejection side of the heat exchanger evaporator/condenser and the liquid pump and flowing in the conduit between the liquid pump and the heat exchanger evaporator, and gaseous second heat transfer fluid flowing in the conduit between the heat exchanger evaporator and the heat absorption side of the heat exchanger evaporator/condenser, and further wherein the liquid pump is a variable speed pump or the second fluid circulation loop includes an expansion device between the liquid pump and the heat exchanger evaporator.

\* \* \* \* \*